United States Patent
Baek et al.

(10) Patent No.: US 12,392,275 B2
(45) Date of Patent: Aug. 19, 2025

(54) WATER SUPPLY MODULE INTEGRATED WITH RESERVOIR TANK

(71) Applicant: Hanon Systems, Daejeon (KR)

(72) Inventors: Seung Su Baek, Daejeon (KR); Seong Woo Jeong, Daejeon (KR); Jungbum Choi, Daejeon (KR); Gwang Ok Ko, Daejeon (KR)

(73) Assignee: HANON SYSTEMS, Daejeon (KR)

(*) Notice: Subject to any disclaimer, the term of this patent is extended or adjusted under 35 U.S.C. 154(b) by 0 days.

(21) Appl. No.: 18/026,172

(22) PCT Filed: Sep. 10, 2021

(86) PCT No.: PCT/KR2021/012324
§ 371 (c)(1),
(2) Date: Mar. 14, 2023

(87) PCT Pub. No.: WO2022/065768
PCT Pub. Date: Mar. 31, 2022

(65) Prior Publication Data
US 2023/0366340 A1    Nov. 16, 2023

(30) Foreign Application Priority Data

Sep. 28, 2020   (KR) .................. 10-2020-0125893
Sep. 28, 2020   (KR) .................. 10-2020-0126155

(51) Int. Cl.
*F01P 11/02*     (2006.01)
*B60K 1/00*      (2006.01)
(Continued)

(52) U.S. Cl.
CPC ............ *F01P 11/029* (2013.01); *B60K 11/02* (2013.01); *F01P 5/10* (2013.01); *F01P 7/16* (2013.01); *B60K 2001/005* (2013.01)

(58) Field of Classification Search
CPC ... F01P 11/029; F01P 5/10; F01P 7/16; B60K 11/02; B60K 2001/005; B60K 1/00; B60K 2001/003
See application file for complete search history.

(56) References Cited

U.S. PATENT DOCUMENTS 4,739,730 A * 4/1988 Jenz ................. F01P 11/029
                                                73/49.3
2020/0171914 A1  6/2020 Han et al.
(Continued)

FOREIGN PATENT DOCUMENTS

JP   H06-081648 A   3/1994
JP   2002021564 A   1/2002
(Continued)

OTHER PUBLICATIONS

Machine Translation of KR 20160097613 A PDF File Name: "KR20160097613A_Machine_Translation.pdf" (Year: 2016).*
(Continued)

*Primary Examiner* — Lindsay M Low
*Assistant Examiner* — Ruben Picon-Feliciano
(74) *Attorney, Agent, or Firm* — NORTON ROSE FULBRIGHT US LLP

(57) ABSTRACT

The present disclosure relates to a water supply module integrated with a reservoir tank, the module comprising: a reservoir tank in which a hollow portion is formed to accommodate cooling water therein, and which includes a first mounting part provided on one side thereof and a second mounting part provided on the other side thereof; a first component mounted on the first mounting part; and a second component mounted on the second mounting part, wherein the first component and the second component pass through the reservoir tank so as to be connected such that cooling water paths are directly connected to each other without bypassing the reservoir tank, and thus a cooling
(Continued)

circuit of a vehicle cooling system can be simplified and formed to be integrated.

18 Claims, 17 Drawing Sheets

(51) Int. Cl.
*B60K 11/02* (2006.01)
*F01P 5/10* (2006.01)
*F01P 7/16* (2006.01)

(56) References Cited

U.S. PATENT DOCUMENTS

| | | | |
|---|---|---|---|
| 2020/0408134 A1* | 12/2020 | Asano | F01P 11/08 |
| 2021/0219466 A1* | 7/2021 | Kim | H01M 10/613 |
| 2023/0311707 A1* | 10/2023 | Lee | B60L 58/26 |
| | | | 220/501 |

FOREIGN PATENT DOCUMENTS

| | | | | |
|---|---|---|---|---|
| JP | 2005248753 A | 9/2005 | | |
| JP | 2019060275 A | 4/2019 | | |
| KR | 19980062795 A | 10/1998 | | |
| KR | 10-2001-0044388 A | 6/2001 | | |
| KR | 20090041561 A | 4/2009 | | |
| KR | 20110138514 A | 12/2011 | | |
| KR | 10-2016-0097613 A | 8/2016 | | |
| KR | 20160097613 A * | 8/2016 | ............ | F02M 26/28 |
| KR | 101765578 B1 | 8/2017 | | |
| KR | 20180099007 A * | 9/2018 | ............ | F01P 11/029 |
| KR | 10-2018-0136633 A | 12/2018 | | |
| KR | 20190019178 A | 2/2019 | | |
| KR | 101934360 B1 | 3/2019 | | |
| KR | 20190020353 A | 3/2019 | | |
| KR | 20200030389 A | 3/2020 | | |

OTHER PUBLICATIONS

Machine Translation of KR 20180099007 A PDF File Name: "KR20180099007A_Machine_Translation.pdf" (Year: 2018).*

* cited by examiner

WATER SUPPLY MODULE INTEGRATED WITH RESERVOIR TANK

CROSS REFERENCE TO RELATED APPLICATIONS

This application is a national phase under 35 U.S.C. § 371 of International Application No. PCT/KR2021/012324 filed on Sep. 10, 2021, which claims the benefit of priority from Korean Patent Application Nos. 10-2020-0125893 filed on Sep. 28, 2020 and 10-2020-0126155 filed on Sep. 28, 2020. The entire contents of these applications are incorporated herein by reference in their entirety.

TECHNICAL FIELD

The present disclosure relates to a water supply module integrated with a reservoir tank, and more particularly, to a water supply module integrated with a reservoir tank in which components of several water supply modules are integrated and connected.

BACKGROUND ART

Recently, due to energy efficiency and environmental pollution problems, there is a demand for the development of eco-friendly vehicles that can substantially replace internal combustion engine vehicles. The eco-friendly vehicle is largely classified into electric vehicles or hydrogen vehicles that use a battery or a fuel cell as an energy source, and hybrid vehicles that are driven using an engine and a battery. Such an eco-friendly vehicle further includes an engine cooling system that manages cooling/heating or the like of the engine, and a separate electric cooling system that manages heat of power electronics (PE) including an electric motor.

The electric cooling system mainly cools power electronics, actuators, a hybrid start and generator (HSG), or the like, using cooling water, and has a structure that increases the temperature of the battery by causing the cooling water to bypass a radiator through a bypass circuit, and at the same time to pass through the battery using waste heat of the power electronics (PE) in the cold season.

An electronic cooling system of an eco-friendly vehicle should satisfy various purposes, such as heating, cooling, and waste heat recovery, from a plurality of water supply module components, but has a problem in that due to limitations of a layout space in a vehicle, the difficulty of arranging each component, designing a hose route, and connecting them increases, in mounting each component on a vehicle, a lot of man-hours are required to individually mount and connect each component and hose, and due to the complicated route, the resistance on the cooling water side is high, and as a result, a high load is applied to the water pump.

RELATED ART DOCUMENT

Korean Patent Publication No. 1765578 (2017 Aug. 1)

DISCLOSURE

Technical Problem

An object of the present disclosure provides relates to a water supply module integrated with a reservoir tank that is connected to a plurality of cooling water lines, integrates components of several water supply modules, and connects the components to each other through the reservoir tank.

Technical Solution

In one general aspect, a water supply module integrated with a reservoir tank may include: a reservoir tank in which a hollow portion is formed to accommodate cooling water therein, and which includes a first mounting part provided on one side thereof and a second mounting part provided on the other side thereof; a first component mounted on the first mounting part; and a second component mounted on the second mounting part, in which the first component and the second component may pass through the reservoir tank so as to be connected.

The reservoir tank may be provided with a through-hole passing in a direction from the first mounting part to the second mounting part, and the cooling water may flow between the first component and the second component through the through-hole.

The water supply module integrated with a reservoir tank may further include: a pipe connecting the first component and the second component, in which the pipe may connect the first component and the second component by passing through the through-hole.

A partition wall dividing an internal space of the reservoir tank into a first chamber and a second chamber may be provided inside the reservoir tank.

The through-hole may be formed to pass through the partition wall.

A thickness of the partition wall may be smaller than a width of a cross section of the through-hole.

First cooling water circulating the first cooling circuit among the cooling water may flow in the first chamber, and second cooling water circulating the second cooling circuit among the cooling water may flow in the second chamber, the reservoir tank may further include a plurality of cooling water entrances through which the cooling water enters and exits, and the plurality of cooling water entrances may include a first chamber cooling water inlet introducing the first cooling water into the first chamber, a first chamber cooling water outlet discharging the first cooling water to an outside of the first chamber, a second chamber cooling water inlet introducing the second cooling water into the second chamber, and a second chamber cooling water outlet discharging the second cooling water to an outside of the second chamber.

An inside of the first component may be provided with a valve assembly having an internal path through which the cooling water flows, the internal path of the valve assembly may include a bifurcating part bifurcated in multiple directions, and the internal path may include first to fifth bifurcating paths bifurcated in each direction from the bifurcating part.

The second component and the first bifurcating path may communicate with each other through the through-hole, the second and third bifurcating paths may form the first cooling circuit, and the fourth and fifth bifurcating paths may form the second bifurcating path, and the first chamber cooling water outlet may communicate with any one of the second and third bifurcating paths, and the second chamber cooling water outlet may communicate with any one of the fourth and fifth bifurcating paths.

The valve assembly may include a first water pump mounting part provided to communicate with any one of the second and third bifurcating paths, and a second water pump mounting part provided to communicate with any one of the fourth and fifth bifurcating paths, the first water pump mounting part may be mounted with a first water pump that pressurizes and transfers the first cooling water flowing through the second and third bifurcating paths, and the second water pump mounting part may be mounted with a second water pump that pressurizes and transfers the second cooling water flowing through the fourth and fifth bifurcating paths.

The second component may be a chiller that regulates a temperature of the cooling water, the chiller may include a pair of pipes through which the cooling water enters and exits, and any one of the pair of pipes may pass through the through-hole and is connected to the valve assembly.

The chiller may include a chiller component coupling structure in which components are coupled, an expansion valve decompressing the cooling water may be coupled to the chiller component coupling structure, and the expansion valve may be disposed between the chiller and the reservoir tank.

The first mounting part may be provided with a gasket coupling structure, a gasket may be coupled to the gasket coupling structure and disposed between the reservoir tank and the first component, the gasket may be a face gasket, and the first component and the face gasket may be in surface contact.

The reservoir tank may include: a housing having the hollow portion formed therein; a partition wall disposed inside the housing to partition the hollow portion of the housing into a plurality of chambers; and a step member disposed inside the reservoir tank to control a flow of the cooling water flowing inside the reservoir tank, and the flow of the cooling water may be guided such that bubbles contained in the cooling water are removed by the step member.

The step member may include: an inner wall step member having one end fixed to an inner wall of the housing and the other end extending to the partition wall; and a partition wall step member having one end fixed to the partition wall and the other end extending to the inner wall of the housing, and the cooling water flowing inside the housing by the inner wall step member and the partition wall step member may flow in a zigzag form along the inner wall step member and the partition wall step member.

The inner wall step member and the partition wall step member may be formed in plurality, and the plurality of inner wall step members and partition wall step members may be alternately arranged along a vertical direction of the reservoir tank.

The plurality of chambers may include a first chamber and a second chamber partitioned by the partition wall, and the housing may includes: a first chamber cooling water inlet introducing the first cooling water into the first chamber; a first chamber cooling water outlet discharging the first cooling water from an inside to an outside of the first chamber; a second chamber cooling water inlet introducing second cooling water into the second chamber; and a second chamber cooling water outlet discharging the second cooling water from the second chamber to the outside, and the first cooling water outlet may be disposed below the first chamber cooling water inlet, and the second cooling water outlet may be disposed below the second chamber cooling water inlet.

The water supply module integrated with a reservoir tank may further include: a cooling water inlet disposed above the housing and through which the cooling water is introduced from the outside; and a distribution member disposed at an upper end of the partition wall to distribute the cooling water introduced from the outside into the first chamber and the second chamber.

The inner wall step member may include: a first inner wall step member disposed on the first chamber and having one end fixed to the inner wall of the housing and the other end extending to the partition wall; and a second inner wall step member disposed on the second chamber and having one end fixed to the inner wall of the housing and the other end extending to the partition wall, and the partition wall step member may include: a first partition wall step member disposed on the first chamber and having one end fixed to the partition wall member and the other end extending to the inner wall of the housing; and a second partition wall step member disposed on the second chamber and having one end fixed to the partition wall member and the other end extending to the inner wall of the housing.

The housing may include a first housing and a second housing coupled to each other to form the hollow portion therein, the step member may be formed in plurality, and some of the plurality of step members may be disposed in the first housing, and others may be disposed in the second housing.

Advantageous Effects

In a water supply module integrated with a reservoir tank of the present disclosure, as a first component and a second component pass through the reservoir tank so as to be connected, a cooling water path is directly connected to each other without bypassing the reservoir tank, so a cooling circuit of a vehicle cooling system may be simplified and formed to be integrated.

In addition, since the water supply module integrated with a reservoir tank of the present disclosure is provided with a partition wall dividing an internal space of the reservoir tank into two chambers, two independent cooling circuits may be configured with only one reservoir tank, thereby reducing the overall packaging size of the vehicle cooling system and reducing costs.

BEST MODE

Hereinafter, the present disclosure will be described in detail with reference to the accompanying drawings.

Figure 1:
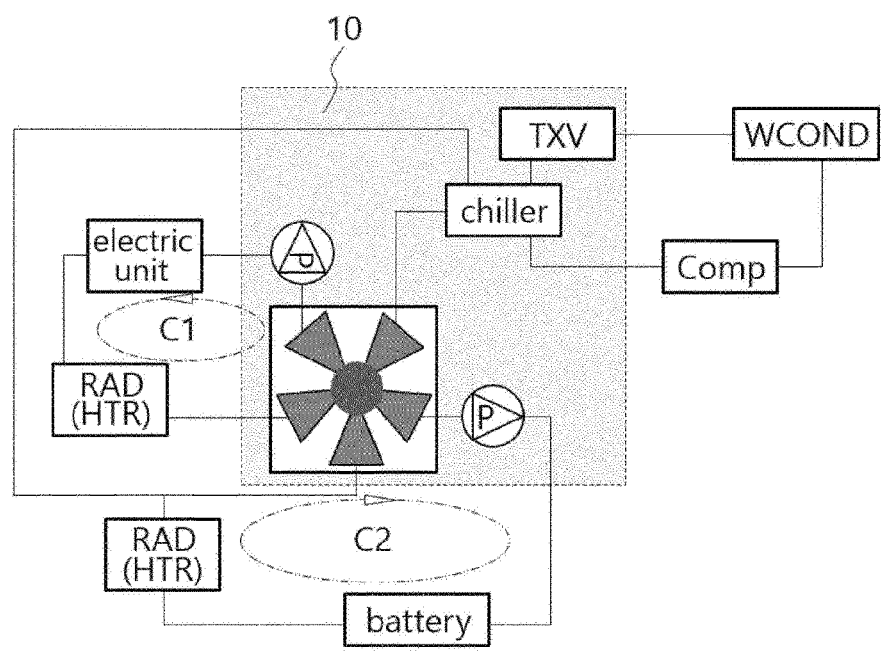
FIG. 1 is a schematic configuration diagram of an electric vehicle cooling circuit according to an example of the present disclosure.

FIG. 1 is a schematic configuration diagram of an electric vehicle cooling circuit according to an example of the present disclosure. The electric vehicle requires a cooling circuit C1 for cooling power electronics (electric unit) and a cooling circuit C2 for cooling a battery, respectively. In such a cooling circuit according to the present disclosure, the cooling circuit is integrated through a water supply module 10 integrated with a reservoir tank that is mounted with a chiller, a valve, a pump P, an expansion valve TXV, etc., centered on the reservoir tank. The reservoir tank of the present disclosure provides a mounting structure and location where each component may be mounted. Meanwhile, in the present disclosure, a cooling circuit for cooling power electronics is referred to as a first cooling circuit c1, and a cooling circuit for cooling a battery is referred to as a second cooling circuit c2. However, the first and second cooling circuits c1 and c2 are not limited thereto and may refer to various types of cooling circuits.

Figure 2:
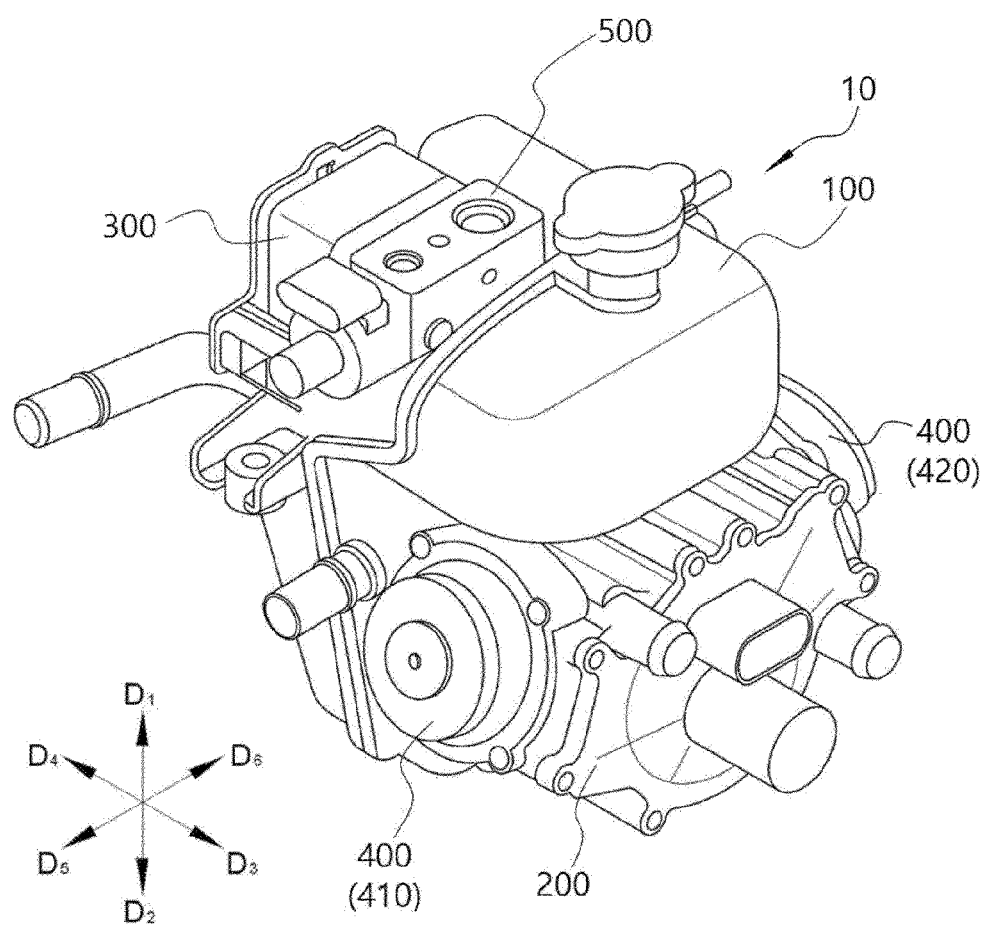
FIG. 2 is a perspective view of a water supply module integrated with a reservoir tank.
Figure 3:
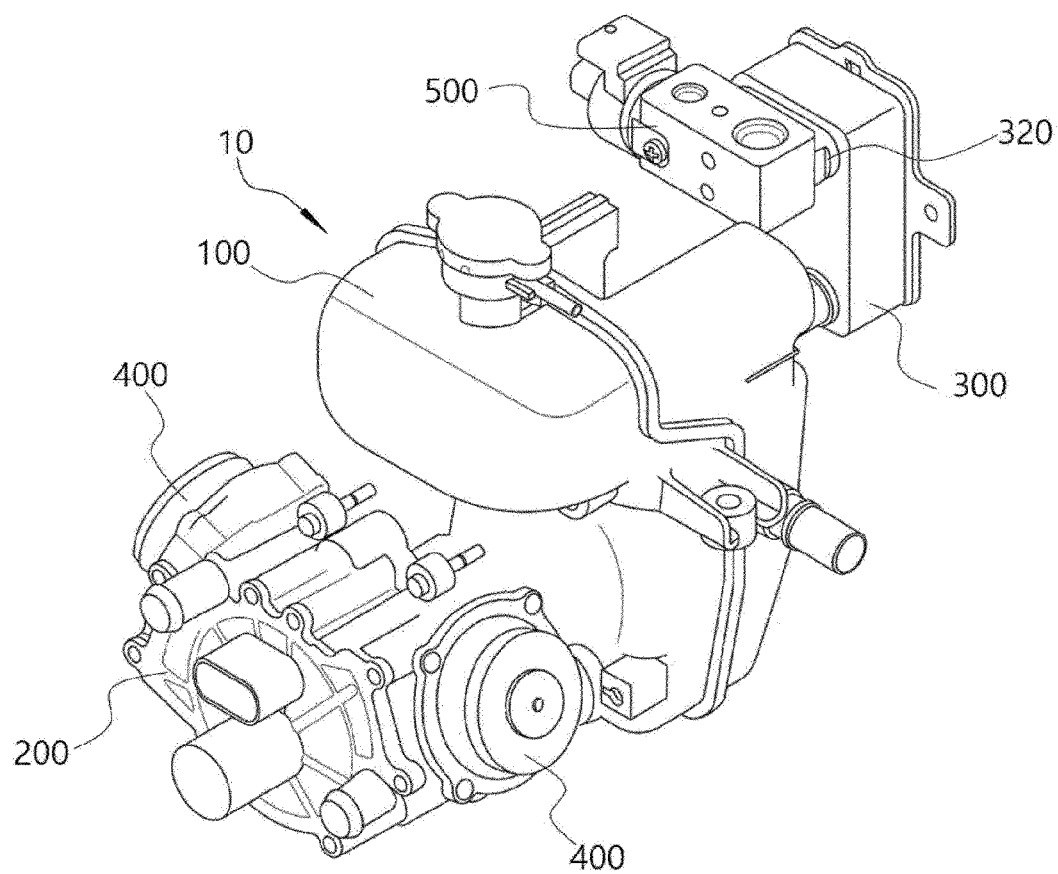
FIG. 3 is an exploded perspective view of a water supply module integrated with a reservoir tank.

FIG. 2 is a perspective view of the water supply module integrated with a reservoir tank, and FIG. 3 is an exploded perspective view of the water supply module integrated with a reservoir tank. Referring to FIGS. 2 and 3, the water supply module 10 integrated with a reservoir tank according to the present disclosure may include a reservoir tank 100 and a valve assembly 200 that includes a component mounted on the reservoir tank 100 and has an internal path, through which cooling water flows, formed therein, in which the component may include a chiller 300 that controls a temperature of cooling water, a water pump 400 that pressurizes and transfers the cooling water, and an expansion valve 500 that decompresses the cooling water. As each component is a well-known technology, a detailed description of a general structure or function will be omitted. Meanwhile, in the following description, for a clearer description, top D1, bottom D2, front D3, back D4, left D5, and right D6 are defined based on the direction display of FIG. 2.

Figure 4:
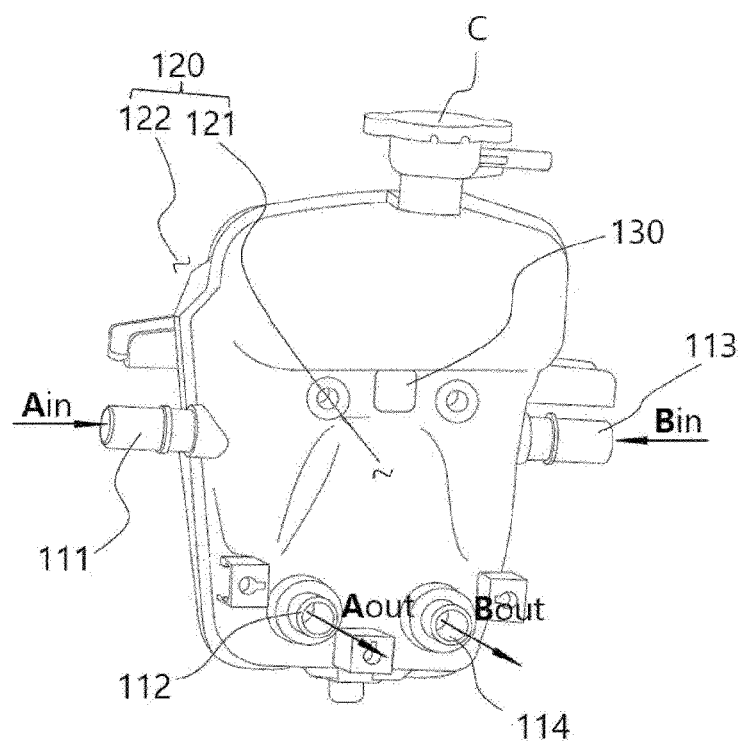
FIG. 4 is a rear perspective view of the reservoir tank.

FIG. 4 is a rear perspective view of the reservoir tank. Referring to FIG. 4, the reservoir tank 100 has cooling water accommodated therein, and the reservoir tank 100 includes a plurality of reservoir tank cooling water entrances 110 through which cooling water enters and exits, and at least one mounting part 120 on which components are mounted. The reservoir tank 100 may be installed to respond to a change in volume of cooling water. More specifically, since the cooling water circulating the first cooling circuit C1 and the second cooling circuit C2 may have a volume changing according to changes in temperature and pressure, when the cooling water has a volume greater than a reference value during the circulation of the cooling water, an excess amount of cooling water may be accommodated in the reservoir tank 100, and when the cooling water is less than the reference value, cooling water enough to supplement insufficient cooling water may be supplied from the outside to the reservoir tank 100. To this end, a stopper C may be provided on an upper side of the reservoir tank 100 to supply the cooling water from the outside.

As illustrated in FIGS. 2 to 4, according to the present disclosure, a first mounting part 121 may be mounted on one side of the reservoir tank 100, a second mounting part 122 may be provided on the other side thereof, a first component 200 may be mounted on the first mounting part 121, and a second component (e.g., chiller 300 as described below) may be mounted on the second mount part. In this case, the first component 200 and the second component 300 may pass through the reservoir tank 100 so as to be connected. More specifically, the reservoir tank 100 is provided with a through-hole 130 passing in a direction from the first mounting part 121 to the second mounting part 122, and cooling water may flow between the first component 200 and the second component 300 through the through-hole 130. Here, a pipe P connecting the first component 200 and the second component 300 is further provided such that the pipe P passes through the through-hole to connect the first component 200 and the second component 300 to each other. The through-hole 300 may be designed in various forms according to a shape of a pipe inserted into the through-hole 300.

As described above, according to the present disclosure, in configuring the cooling water path, in order to connect each component to each other, each component passes through the reservoir tank to be directly connected to each other without bypassing the reservoir tank, and thus the cooling circuit of the vehicle cooling system may be simplified and formed to be integrated.

Figure 5:
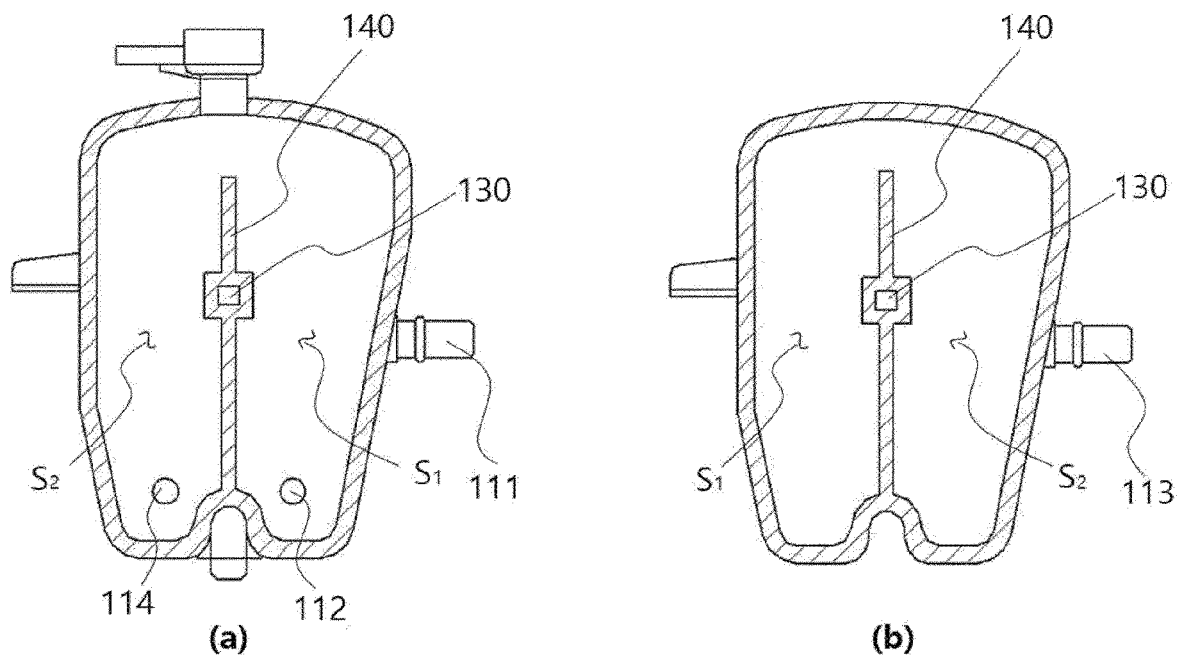
FIG. 5 is an internal cross-sectional view of the reservoir tank.

FIG. 5 is a cross-sectional view of the inside of the reservoir tank, in which FIG. 5A illustrates a cross section from the inside to the front, and FIG. 5B illustrates a cross section from the inside to the rear. A partition wall 140 dividing a space inside the reservoir tank 100 into a first chamber S1 and a second chamber S2 may be provided inside the reservoir tank 100. In this case, cooling water (hereinafter, referred to as 'first cooling water A') circulating in the first cooling circuit among the cooling water may flow in the first chamber S1 and cooling water (hereinafter, referred to as 'second cooling water B') circulating through the second cooling circuit among the cooling water may flow in the second chamber S2.

The partition wall 140 extends upward from the bottom inside the reservoir tank 100 to divide the internal space of the reservoir tank 100 into the first chamber S1 and the second chamber S2, and the chamber S1 and the second chamber S2 may be divided from each other by the partition wall, and thus may configure the independent cooling circuit such that the first cooling water A in the first chamber S1 and the second cooling water B in the second chamber S2 are not mixed with each other. Due to such a partition wall structure, compared to the case where the reservoir tank has to be provided in each cooling circuit to configure the battery cooling circuit and the power electronics cooling circuit, the present disclosure enables two cooling circuits to be configured with only one reservoir tank, and thus, the overall packaging size of the vehicle cooling system may be reduced and costs may be reduced.

Here, according to the present disclosure, the through-hole 130 may be formed to pass through the partition wall 140. That is, as well illustrated in FIG. 5, the through-hole 130 may be formed to pass through the partition wall 140 and integrally formed with the partition wall 140, and the width of the cross section of the through-hole 130 may be larger than the thickness of the partition wall 140. To this end, the partition wall 140 is formed to have a constant thickness except for a portion through which the through-hole 130 passes, and may have a form in which the partition wall 140 is divided into one side and the other side at a starting point through which the through-hole 130 passes such that one side is recessed into the left side and the other side is recessed into the right side, and then one side and the other side of the partition wall 140 are combined again at an ending point of the portion through which the through-hole 130 passes.

In this way, as the through-hole is configured to pass through the partition wall, it is possible to design the first chamber and the second chamber symmetrically, so it is possible to make the capacities of cooling water accommodated in the first chamber and the second chamber the same and when the cooling water flows between the first chamber and the second chamber, it is possible to prevent the cooling water flow resistance on either side from being deflected to a large extent.

Meanwhile, in the present disclosure, although a single through-hole is described as an example, it goes without saying that a plurality of through-holes connecting the first and second components may be formed for various modifications of the cooling circuit, and one or more other through-holes connecting the third and fourth components may be further formed.

In addition, as illustrated in FIGS. 4 and 5, the reservoir tank 100 of the present disclosure may have a plurality of cooling water entrances 110. In this case, the plurality of cooling water entrances 100 may include a first chamber cooling water inlet 111 which communicates with the first chamber S1 and through which the first cooling water A is introduced into the first chamber S1, a first chamber cooling water outlet 112 which communicates with the first chamber S1 to discharge the first cooling water A from the inside of the first chamber S1 to the outside, a second chamber cooling water inlet 113 which communicates with the second chamber S2 such that the second cooling water B is introduced into the second chamber S2, and a second chamber cooling water outlet 114 which communicates with the second chamber S2 such that the second cooling water B is discharged from the second chamber S2 to the outside.

In this way, as one reservoir tank is divided into two chambers through a partition wall and a cooling water inlet and an entrance are separately provided in each chamber, two independent cooling circuits may be configured using one reservoir tank.

Furthermore, as illustrated in FIGS. 4 and 5, the through-hole 130 passing through the reservoir tank 100 is formed in the reservoir tank 100, and one component and another component can be connected to each other through the through-hole 130. More specifically, a component mounted on one of the plurality of mounting parts 120 of the reservoir tank 100 and a component mounted on the other of the plurality of mounting parts 120 may communicate with each other through the pipe P passing through the through-hole 130. Here, communicating means that each component is connected or coupled such that cooling water may flow between the respective components. To this end, a cooling water entrance is provided in the component such that the cooling water entrance and the pipe p may be connected to each other.

According to the present disclosure, as the through-hole 130 is provided in the reservoir tank 100, and the pipe P passes through the through-hole 130 to form a structure in which different components may be directly connected, it is possible to reduce additional hoses or piping for connection between components, and it is possible to not only increase the mounting convenience, but also simplify an airtight structure for maintaining the airtightness of the cooling water in order to reduce an airtight part of connection portions between the respective components.

Figure 6:
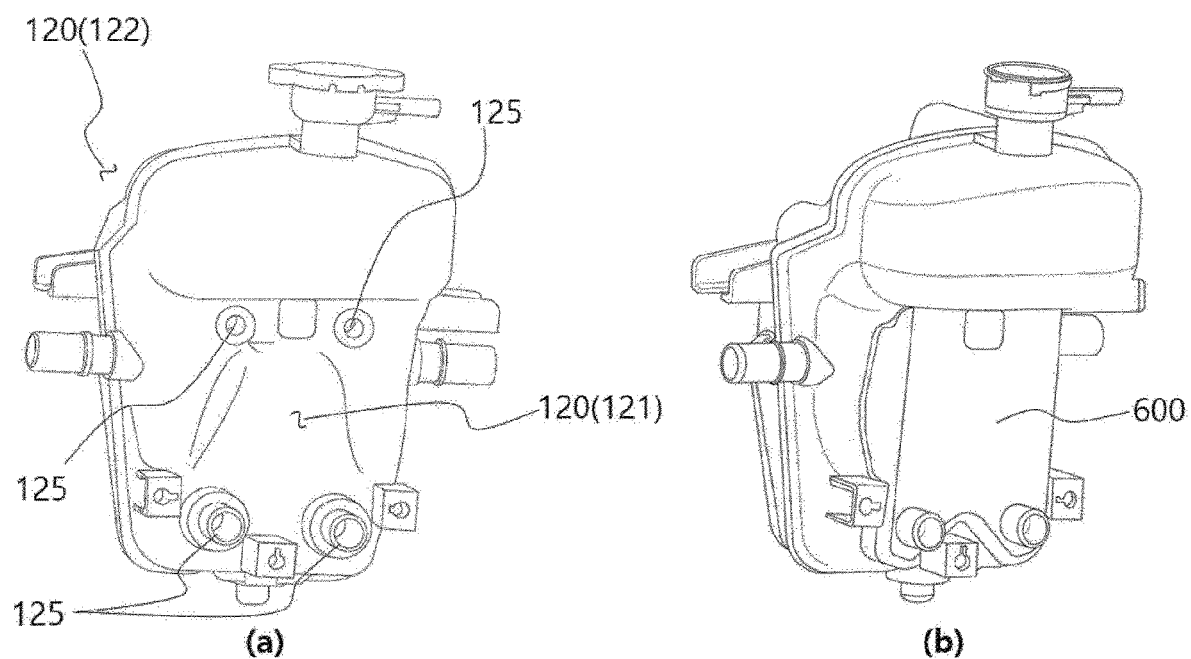
FIG. 6 is a diagram illustrating that a gasket is coupled to the reservoir tank.

FIG. 6 illustrates that the gasket is coupled to the reservoir tank, in which FIG. 6A illustrates a gasket coupling structure 125 of the mounting part 120 and FIG. 6B illustrates that the gasket 600 is coupled to the mounting part 120. As illustrated, at least one mounting part 121 of the plurality of mounting parts 120 of the reservoir tank 100 may be provided with the gasket coupling structure 125, and the gasket 600 may be coupled to the gasket coupling structure 125. Accordingly, the gasket 600 may be disposed between the reservoir tank 100 and a component mounted on the mounting part 121 provided with the gasket coupling structure 125. The gasket 600 is intended to improve the airtightness between the reservoir tank 100 and the components, and may more reliably prevent leakage of cooling water to the outside at connection portions where the reservoir tank 100 and the components are connected.

Hereinafter, the present disclosure will be described in more detail through a water supply module integrated with a reservoir tank according to a specific embodiment of the present disclosure.

In the water supply module integrated with a reservoir tank 10 according to the embodiment of the present disclosure, the valve assembly 200 may be mounted on one side of the reservoir tank 100, the chiller 300 may be mounted on the other side of the reservoir tank, and the water pump 400 may be coupled to the valve assembly 200.

More specifically, referring to FIGS. 3 and 4, the mounting part 120 of the reservoir tank 100 may include the first mounting part 121 provided on one side of the reservoir tank 100 and the second mounting part 122 provided on the other side of the reservoir tank 100, and the valve assembly 200 may be mounted on the first mounting part 121 and the chiller 300 may be mounted on the second mounting part. At least one water pump mounting part 220 may be provided in the valve assembly 200, and the water pump 400 may be coupled to the water pump mounting part 220. For example, as illustrated, the first mounting part 121 may be formed on a front lower portion of the reservoir tank 100, the second mounting part 122 may be formed on a rear upper portion of the reservoir tank 100, and the first mounting part 121 and the second mounting part 122 may be formed to be recessed into the reservoir tank 100 to accommodate the valve assembly 200 and the chiller 300, respectively.

Figure 7:
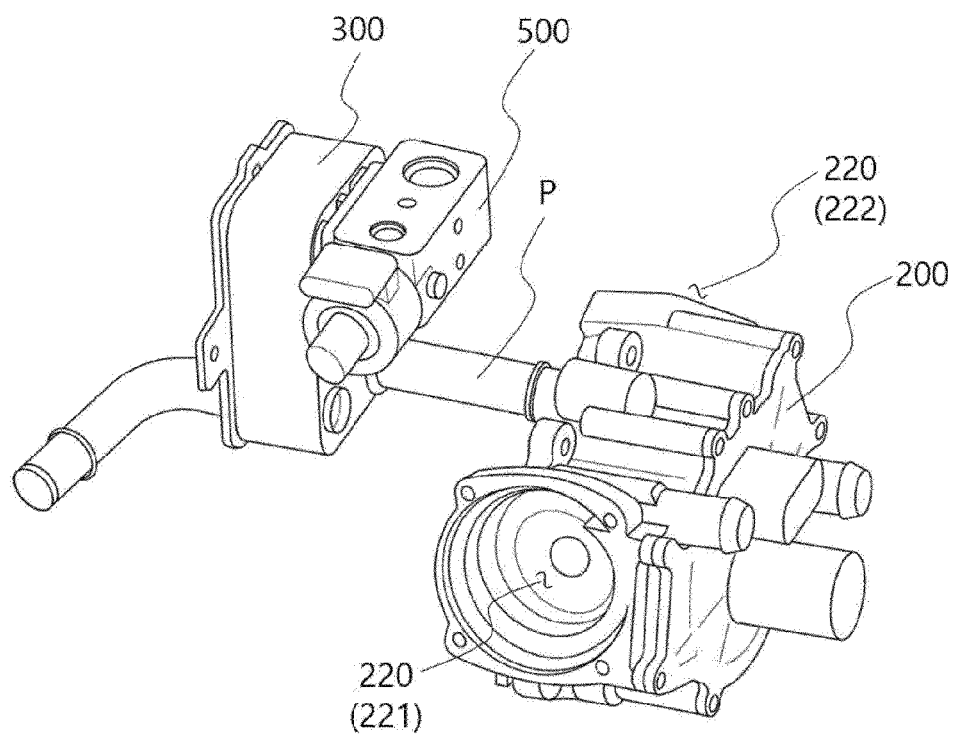
FIG. 7 is a diagram illustrating that a valve assembly and a chiller communicate with each other.

In this case, as described above, the reservoir tank is provided with the through-hole 130 passing in a direction from the first mounting part 121 to the second mounting part 122, and the pipe P passes through the through-hole 130 to make the valve assembly 200 and the chiller 300 communicate with each other through the pipe P. FIG. 7 illustrates that the valve assembly and the chiller communicate with each other. As illustrated, the valve assembly 200 and the chiller 300 may be directly connected through the pipe P, and the reservoir tank 100 may be disposed between the valve assembly 200 and the chiller 300 by allowing the pipe P to pass through the through-hole 130. As such, as the through-hole is formed in the reservoir tank and the chiller and valve assembly are directly connected by passing a pipe through the through-hole, the space utilization may be maximized and the cooling circuit may be formed to be integrated.

Figure 8:
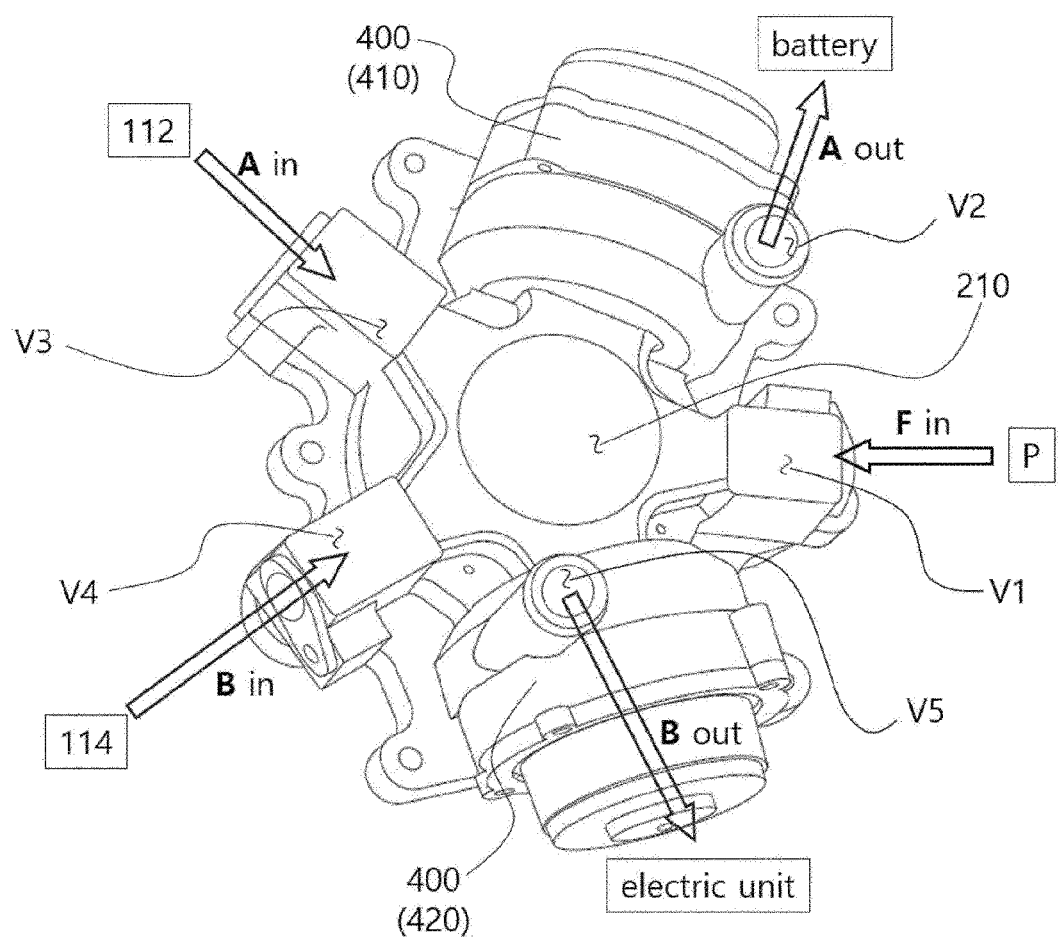
FIG. 8 is a perspective view of the valve assembly.

Meanwhile, a bifurcating part 210 bifurcated in multiple directions may be formed in an internal path of the valve assembly 200. FIG. 8 is a perspective view of the valve assembly. As illustrated, the valve assembly 200 may be a 5-way valve, and thus the internal path may be bifurcated in 5 directions around the bifurcating part 210. In this case, a first bifurcating path V1, which is one of the internal paths bifurcated in each direction from the bifurcating part 210, may communicate with the pipe P. That is, one end portion of the pipe P is connected to one end portion of the first bifurcating path V1, so the first bifurcating path V1 and the pipe P may communicate with each other. As a result, cooling water F may flow between the valve assembly 200 and the chiller 300 connected to the other end of the pipe P. In this case, the end portions of each bifurcating path may correspond to the cooling water entrance of the valve assembly 200 by itself or the end portions of each bifurcating path may communicate with the cooling water entrance of the valve assembly 200.

Here, second and third bifurcating paths V2 and V3 among the internal paths bifurcated in each direction from the bifurcating part 210 may form the first cooling circuit C1, and fourth and fifth bifurcating paths V4 and V5 among the internal paths bifurcated in each direction from the bifurcating part 210 may form the second cooling circuit C2. In addition, the first chamber cooling water outlet 112 may communicate with any one of the second and third bifurcating paths V2 and V3, and the second chamber cooling water outlet 114 may communicate with one of the fourth and fifth bifurcating paths V4 and V5, so the cooling water between the reservoir tank 100 and the valve assembly 200 may flow with respect to each other. For example, referring to FIGS. 1, 2, and 8, the first cooling water A introduced into the first chamber S1 through the first chamber cooling water inlet 111 is discharged to the first chamber cooling water outlet 112, and introduced into the third bifurcating path V3 communicating with the first chamber cooling water outlet 112, and the first cooling water A introduced into the third bifurcating path V3 may be circulated to be discharged to the second bifurcating path V2 to cool a battery and introduced back into the first chamber S1 of the reservoir tank 100 to form the first cooling circuit C1. Similarly, the second cooling water B introduced into the second chamber S2 through the second chamber cooling water inlet 113 is discharged to the second chamber cooling water outlet 114, and introduced into the fourth bifurcating path V4 communicating with the second chamber cooling water outlet 114, and the second cooling water B introduced into the fourth bifurcating path V4 may be circulated to be discharged to the fifth bifurcating path V5 to cool power electronics (electric unit) and introduced back into the second chamber of the reservoir tank to form the second cooling circuit.

Furthermore, as illustrated in FIGS. 7 and 8, the water pump mounting part 220 of the valve assembly 200 includes a first water pump mounting part 221 communicating with any one of the second and third bifurcating paths V2 and V3 and a second water pump mounting part 222 communicating with any one of the fourth and fifth bifurcating paths V4 and V5, in which the first water pump mounting part 221 may be mounted with a first water pump 410 that pressurizes and transfers the first cooling water A flowing through the second and third bifurcating paths V2 and V3 and the second water pump mounting part 222 may be mounted with a second water pump 420 that pressurizes and transfers the second cooling water (B) flowing through the fourth and fifth bifurcating paths V4 and V5. For example, as well illustrated in FIG. 2, the first water pump 410 may be mounted on the left side of the valve assembly 200 and the second water pump 420 is mounted on the right side of the valve assembly 200. Referring to FIG. 8, the first water pump 410 may be mounted near the second bifurcating path V2 to pressurize and transfer the first cooling water A flowing through the second and third bifurcating paths V2 and V3, and the second water pump 420 may be mounted near the fifth bifurcating path V5 to pressurize and transfer the second cooling water B flowing through the fourth and fifth bifurcating paths V4 and V5. In this case, the water pump 400 may be an electric water pump (EWP). As described above, as the water pump is mounted in each of the first cooling circuit and the second cooling circuit, the cooling water circulation of each cooling circuit may be performed independently, and according to the present disclosure, the cooling water of two cooling circuits can be sufficiently circulated with only one water supply module integrated with a reservoir tank.

Figure 9:
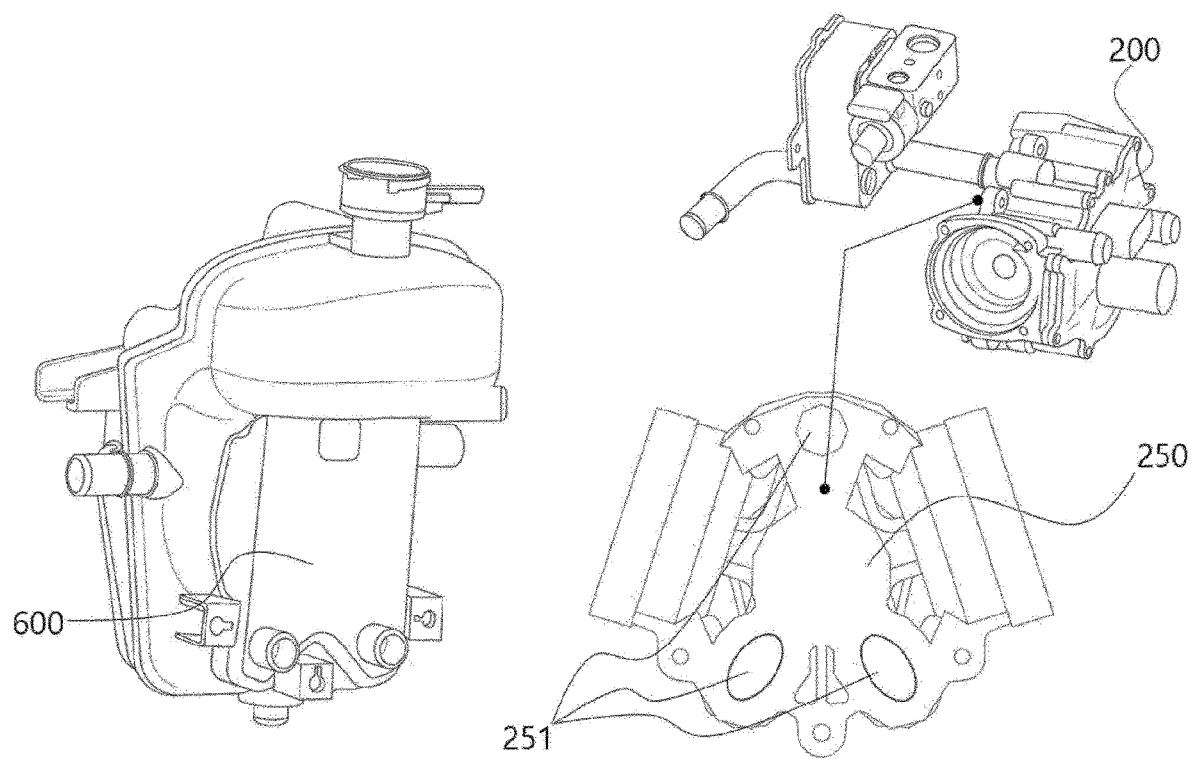
FIG. 9 is a view for describing a surface contact portion between the gasket and the valve assembly.

Meanwhile, as described above with reference to FIG. 6, in the water supply module 10 integrated with a reservoir tank, the first mounting part 121 may be provided with a gasket coupling structure 125, and the gasket 600 may be coupled to the gasket coupling structure 125 of the first mounting part 121 to be disposed between the reservoir tank 100 and the valve assembly 200. In this case, the valve assembly 200 may include a surface contact portion 250 that is in surface contact with the gasket 600, and the surface contact portion 250 and the gasket 600 may come into close contact to improve the airtightness. FIG. 9 is a view for describing the surface contact portion of the gasket and the valve assembly. As illustrated, the gasket 600 may be provided on the front surface of the first mounting part 121 and the surface contact portion 250 may be provided on the rear surface of the valve assembly 200, so the gasket 600 and the valve assembly 200 may be in surface contact. In this case, an O-ring O may be formed in the gasket 600 by passing through a connection portion where the pipe P and the valve assembly 200 are connected and a connection portion where the first chamber cooling water outlet 112 and the second chamber cooling water outlet 114 and the valve assembly 200 are connected.

Furthermore, in the water supply module 10 integrated with a reservoir tank of the present disclosure, the chiller 300 may be provided with one or more chiller component coupling structures 320 on which components may be mounted. In this case, the expansion valve 500 is mounted on the chiller component coupling structure 320, but the expansion valve 500 may be coupled to the chiller component coupling structure 320 such that the expansion valve 500 is disposed between the chiller 300 and the reservoir tank 100. That is, as illustrated in FIG. 3, a chiller component coupling structure 320 may be provided on the upper side of the front surface of the chiller 300, and the expansion valve 500 may be coupled to the chiller component coupling structure 320. In this case, the expansion valve 500 may be disposed between the chiller 300 and the reservoir tank 100. This may drastically reduce the overall packaging size of the water supply module integrated with a reservoir tank and further maximize the space utilization.

Hereinafter, the reservoir tank 100 according to various embodiments will be described in more detail.

The electric cooling system may configure a cooling circuit including a heat exchanger and a water pump to cool circulating cooling water, and since the volume of the cooling water changes according to the temperature, the reservoir tank capable of adjusting the volume may be additionally disposed in the cooling circuit. In this case, bubbles may be generated due to various factors while the cooling water circulates through a conduit, and the generated bubbles lead to a problem in that cooling efficiency is lowered. Korean Patent Publication No. 10-1765589 discloses a technique for improving efficiency by removing generated air bubbles through a separate collection space. However, a large amount of bubbles may be generated even when the cooling water is injected or flows into the reservoir tank, along with the passage of the water pump, the passage of the curved surface of the conduit, and the heating by engine heat which are described in the relevant technology, and bubbles generated in the reservoir tank may lead to a problem in which the cooling efficiency of the cooling system may be lowered.

The reservoir tank 100 of the present disclosure may solve this problem by adopting the solution described below.

Figure 10:
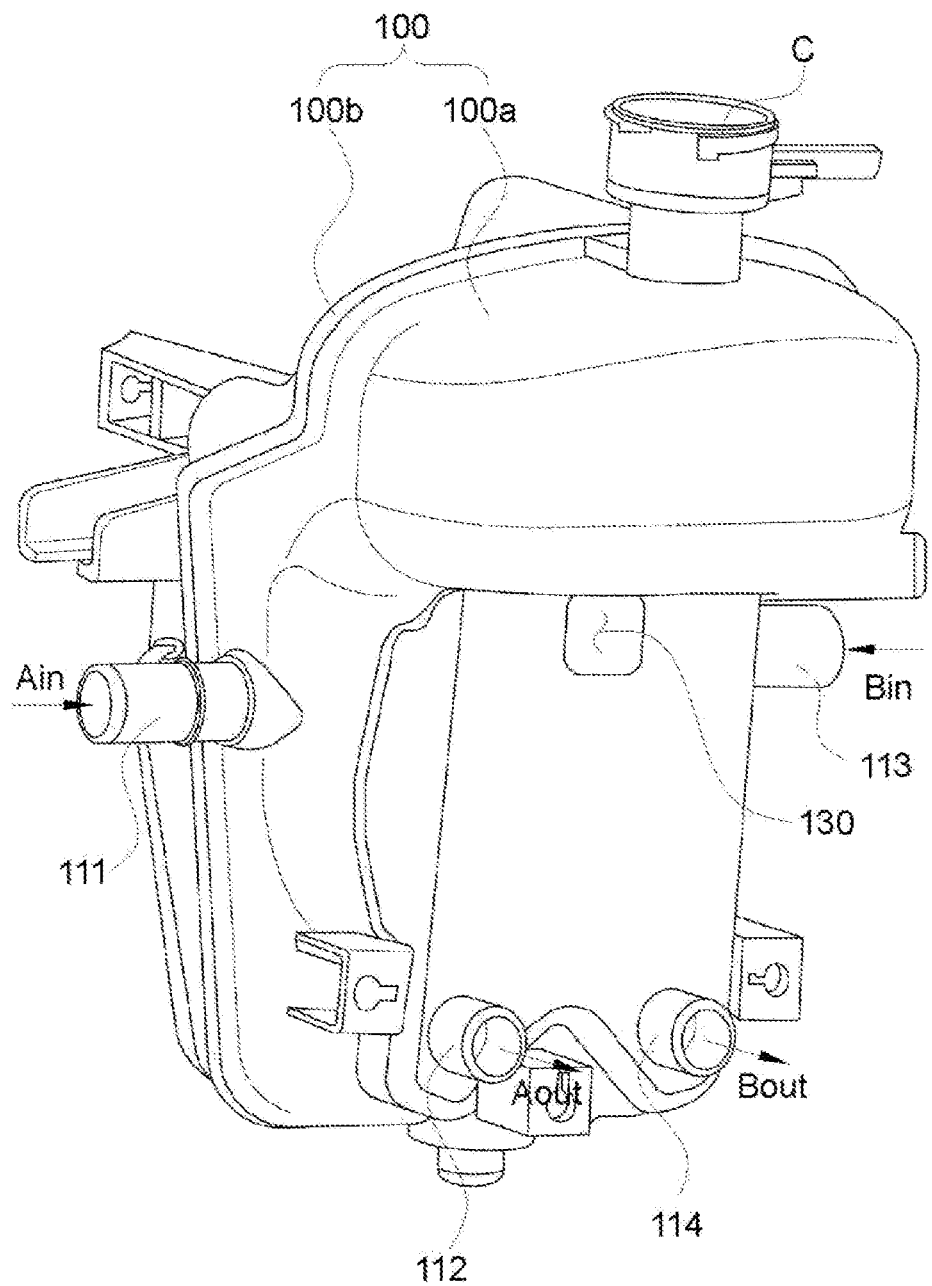
FIG. 10 is a diagram illustrating FIG. 4 again.

FIG. 10 illustrates FIG. 4 again. As illustrated, in the reservoir tank 100 of the present disclosure, a first tank body 100a and a second tank body 100b are coupled to each other in the front and rear directions to form an inner hollow portion. The above-mentioned first chamber cooling water inlet 111, first chamber cooling water outlet 112, second chamber cooling water inlet 113, and second chamber cooling water outlet 114 may be disposed on one of the first tank body 100a and the second tank body 100b. FIG. 10 illustrates that the first chamber cooling water inlet 111, the first chamber cooling water outlet 112, and the second chamber cooling water outlet 114 are disposed on the first tank body 100a disposed on the front side, and the second chamber cooling water inlet 113 is connected to the second tank body 100b disposed on the rear side, but the disposition structure may be modified in various forms in consideration of compatibility.

Figure 11:
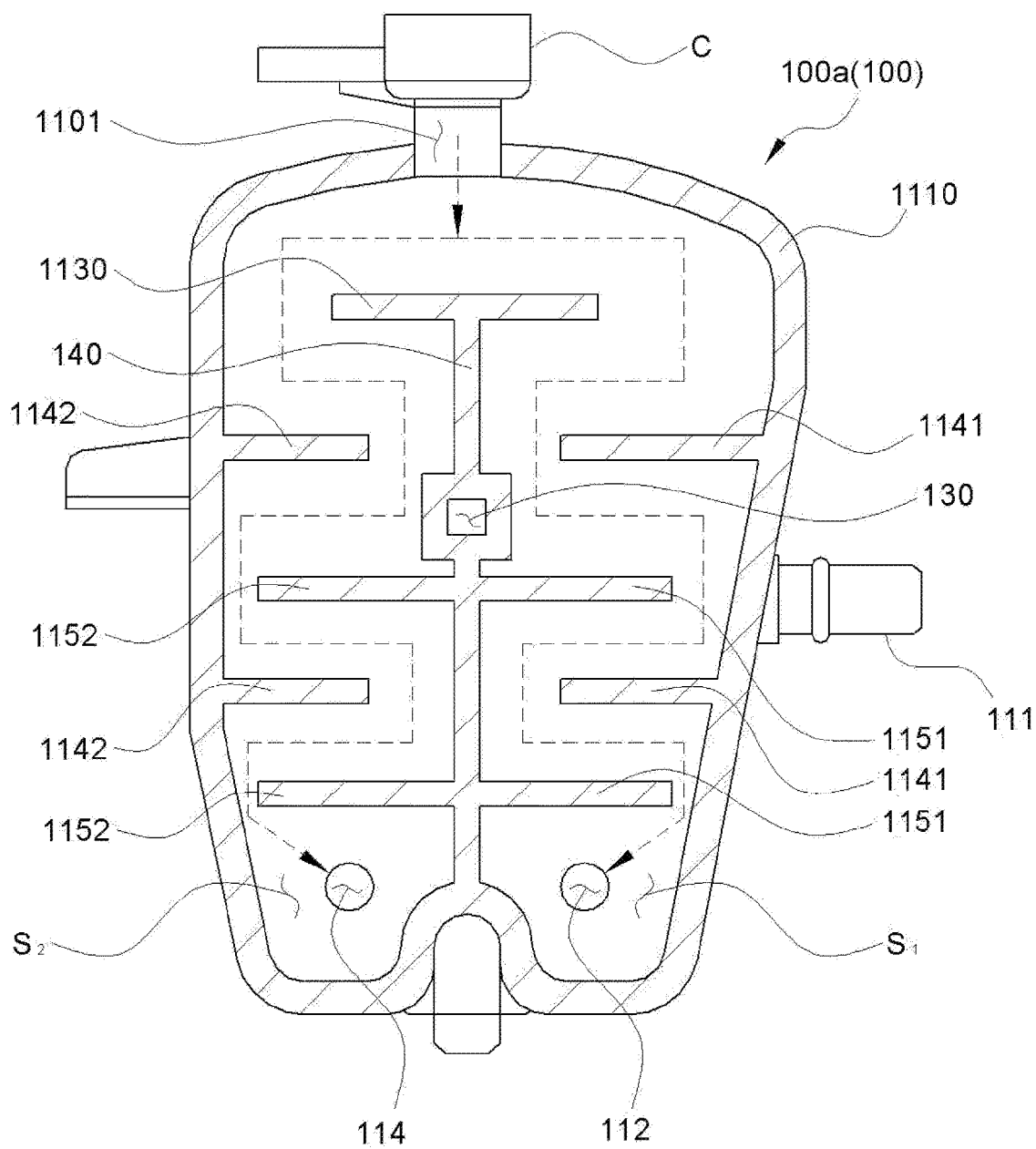
FIG. 11 is a cross-sectional view of a reservoir tank according to a first embodiment of the present disclosure.

FIG. 11 relates to a reservoir tank according to a first embodiment of the present disclosure, and FIG. 11 illustrates a cross-sectional view of the reservoir tank. In this case, FIG. 11 is a cross-sectional view from the rear to the front to illustrate the first tank body 100a of the reservoir tank 100. As the left and right sides are reversed in the drawing, description will be made by defining, as one side, the direction in which the first chamber cooling water outlet 112 is disposed, and defining, as the other side, the direction in which the second chamber cooling water outlet 114 is disposed.

Referring to FIG. 11, the reservoir tank 100 of the present disclosure may include a housing 1110 having a hollow portion formed therein, and a partition wall 140 disposed inside the housing 1110. In this case, the partition wall 140 may have a shape in which a lower end is coupled to the inner bottom surface of the housing 1110 and extend upward so as to partition the hollow portion in the housing 1110 into the first chamber S1 and the second chamber S2. In addition, the upper end of the partition 140 is disposed below the inner upper surface of the housing 1110 such that a space communicating with the first chamber S1 and the second chamber S2 may be formed on the upper side of the partition wall 140. In this case, the reservoir tank 100 of the present disclosure may further include distribution members 1130 that are coupled to the upper end of the partition wall 140 and extend to both sides. In addition, the stopper C is disposed above the distribution member 1130, and when a user opens the stopper C and pours cooling water F, the cooling water F may be distributed to the first chamber S1 and the second chamber S2 through the guide of the distribution member 1130.

The reservoir tank 100 of the present disclosure may further include inner wall step members 1141 and 1142 and partition wall step members 1151 and 1152. In this case, the inner wall step members 1141 and 1142 may include the first inner wall step member 1141 and the second inner wall step member 1142, and the partition wall step members 1151 and 1152 may also include the first partition wall step member 1151 and the second partition wall step member 1152. Here, the first inner wall step member 1141 and the second inner wall step member 1142 may have one end fixed to the inner wall of the housing 1110 and the other end that may extend toward the inner center of the housing 1110 where the partition wall 140 is disposed. In addition, the first partition wall step member 1151 and the second partition wall step member 1152 may have one end that may be fixed to the outer surface of the partition wall 140 and the other end that may extend toward the inner wall of the housing 1110. In addition, a gap may be formed between the other ends of the first inner wall step member 1141 and the second inner wall step member 1142 and the partition wall 140 to make cooling water flow therebetween, and a gap may also be formed between the other ends of the first partition wall step member 1151 and the second partition wall step member 1152 and the housing 1110.

The first inner wall step member 1141 and the first partition wall step member 1151 may be disposed on the first chamber S1, and the second inner wall step member 1142 and the second partition wall step member 1152 may be disposed on the second chamber S2. Each of the first chamber S1 and the second chamber S2 may be connected to the first chamber cooling water outlet 112 and the second chamber cooling water outlet 114 through which the first cooling water and the second cooling water are discharged. Here, the first inner wall step member 1141 and the first partition wall step member 1151 may be alternately disposed up and down on the first chamber S1, and the first cooling water may flow in a zigzag form along the first inner wall step member 1141 and the first partition wall step member 1151. The second inner wall step member 1142 and the second partition wall step member 1152 may be alternately disposed up and down on the second chamber S1, and the second cooling water may flow in a zigzag form along the second inner wall step member 1142 and the second partition wall step member 1152.

One side and the other side of the first inner wall step member 1141 and the second inner wall step member 1142 may be disposed around the partition wall 140, and the other ends may face each other around the partition wall. In addition, the first partition wall step member 1151 and the second partition wall step member 1152 may be disposed at heights corresponding to each other and extend in both directions.

The above-described through-hole 130 may be disposed to pass through the partition wall 140, and the through-hole 130 may be formed by bifurcating the partition wall 140 from the upper and lower central portion to both sides and then coupling the partition wall 140 again. In this case, the through-hole 130 may be designed in various forms according to the shape of the pipe to be inserted.

Figure 12:
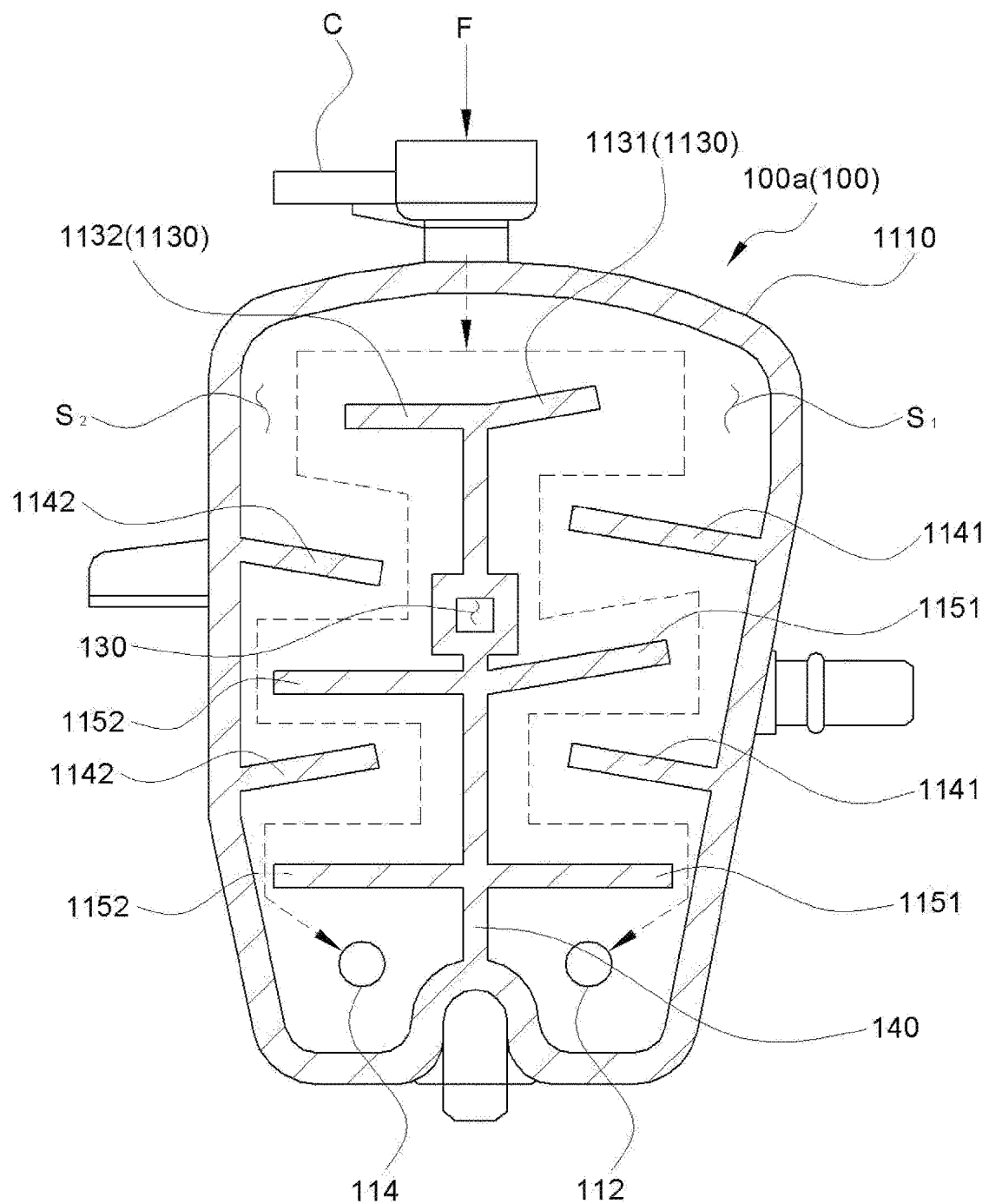
FIG. 12 is a cross-sectional view of a reservoir tank according to a second embodiment of the present disclosure.

FIG. 12 relates to a reservoir tank according to a second embodiment of the present disclosure, and FIG. 12 illustrates a cross-sectional view of the reservoir tank. In this case, FIG. 12 is a cross-sectional view from the rear to the front to illustrate the first tank body 100a of the reservoir tank 100. As the left and right sides are reversed in the drawing, description will be made by defining, as one side, the direction in which the first chamber cooling water outlet 112 is disposed, and defining, as the other side, the direction in which the second chamber cooling water outlet 114 is disposed.

Referring to FIG. 12, the distribution member 1130 coupled to the upper end of the partition wall 120 includes a first distribution member 1131 extending to one side of the partition wall 140 and a second distribution member 1132 extending to the other side of the partition wall 140. The first distribution member 1131 or the second distribution member 1132 may have a shape inclined upward or downward, in which the inclined shape may be a shape in which the other end is biased upward and downward than one end such as being inclined or bent.

The first inner wall step member 1141, the second inner wall step member 1142, the first partition wall step member 1151, and the second partition wall step member 1152 may also have an inclined shape with one end and the other end deflected upward and downward. In this case, the first inner wall step member 1141, the second inner wall step member 1142, the first partition wall step member 1151, and the second partition wall step member 1152 may be made in plurality up and down and disposed to be spaced apart from each other.

In this case, as in the illustrated first inner wall step member 1141, a plurality of them may be inclined to the same side, and as in the illustrated second inner wall step member 1142, some of them may be inclined in different directions. In addition, as in the illustrated first partition wall step member 1151, one end and the other end may be disposed at the same height, or as in the illustrated second partition wall step member 1152, only some of a plurality of them may be inclined. Here, the shapes of the first inner wall step member 1141, the second inner wall step member 1142, the first partition wall step member 1151, and the second partition wall step member 1152 are not limited to those illustrated, and may be changed to any one of the above-mentioned various forms.

Figure 13:
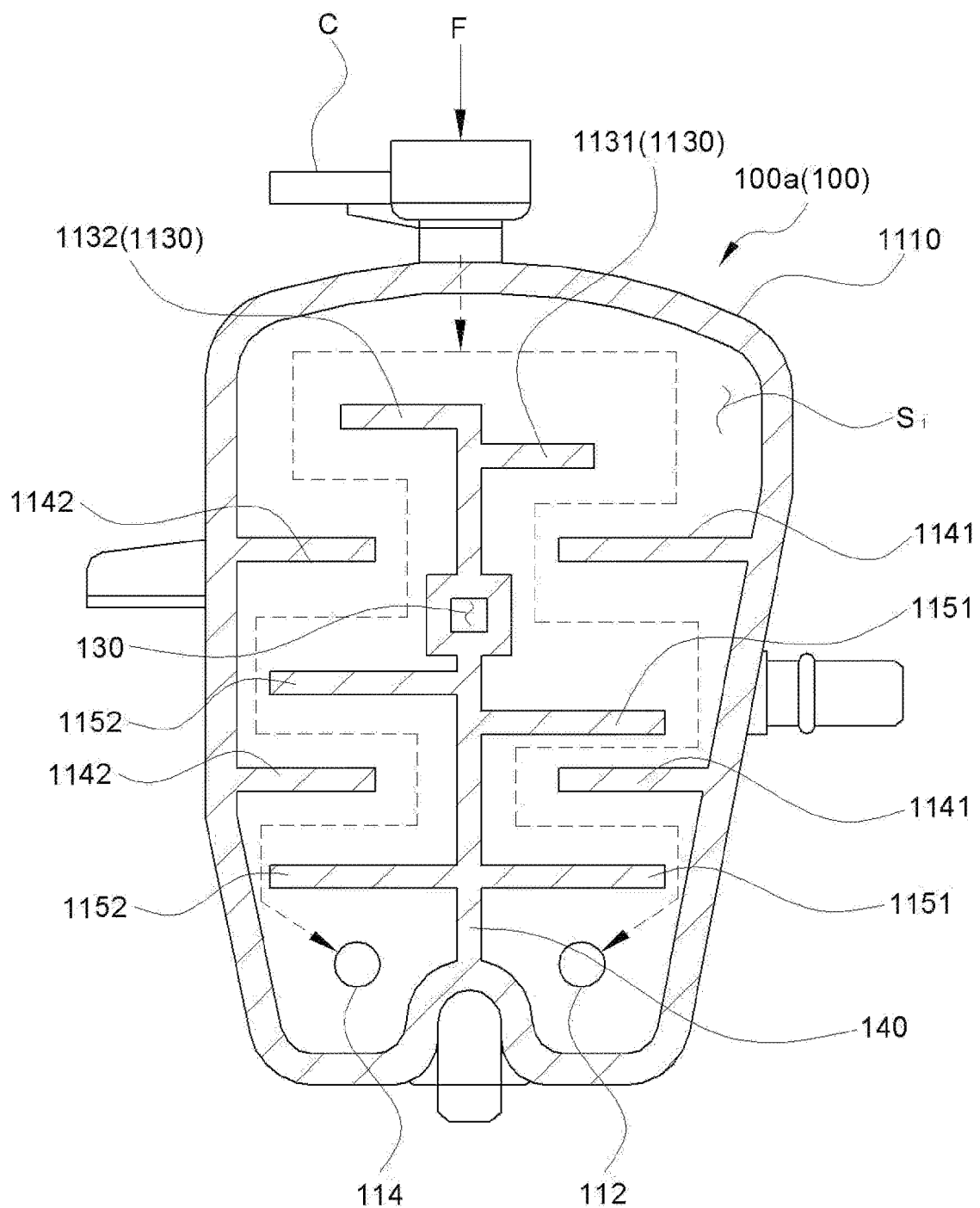
FIG. 13 is a cross-sectional view of a reservoir tank according to a third embodiment of the present disclosure.

FIG. 13 relates to a reservoir tank according to a third embodiment of the present disclosure, and FIG. 13 illustrates a cross-sectional view of the reservoir tank. In this case, FIG. 13 is a cross-sectional view from the rear to the front to illustrate the first tank body 100a of the reservoir tank 100. As the left and right sides are reversed in the drawing, description will be made by defining, as one side, the direction in which the first chamber cooling water outlet 112 is disposed, and defining, as the other side, the direction in which the second chamber cooling water outlet 114 is disposed.

Referring to FIG. 13, the first distribution member 1131 and the second distribution member 1132 may be formed at different heights and may be arranged to cross each other. In this case, the first inner wall step member 1141 and the second inner wall step member 1142 may be disposed at different heights, or the first partition wall step member 1151 and the second partition wall step member 1152 are at different heights. Here, when a plurality of the first inner wall step member 1141, the second inner wall step member 1142, the first partition wall step member 1151, or the second partition wall step member 1152 are formed in plurality, some of the plurality of the first inner wall step members 1141 and second inner wall step members 1142 are disposed to cross each other, or some of the plurality of first partition wall step members 1151 and second partition wall step members 1152 may be disposed to cross each other.

The other end of the first inner wall step member 1141 may be disposed above one surface of the first partition wall step member 1151. Accordingly, a tunnel through which cooling water may flow may be formed by being disposed to partially face each other between one surface of the first inner wall step member 1141 and one surface of the first partition wall step member 1151. Here, some of the plurality of first inner wall step members 1141 and the first partition wall step member 1151 may have different upper and lower gaps to control cooling water. For example, a pair of first partition wall step members 1151 are disposed above and below one first inner wall step member 1141, and the vertical spacing between the other first partition wall step member 1151 and the first inner wall step member 1141 may be disposed to be closer than the vertical spacing of one of the first partition wall step member 1151 and the first inner wall step member 1141.

Figure 14:
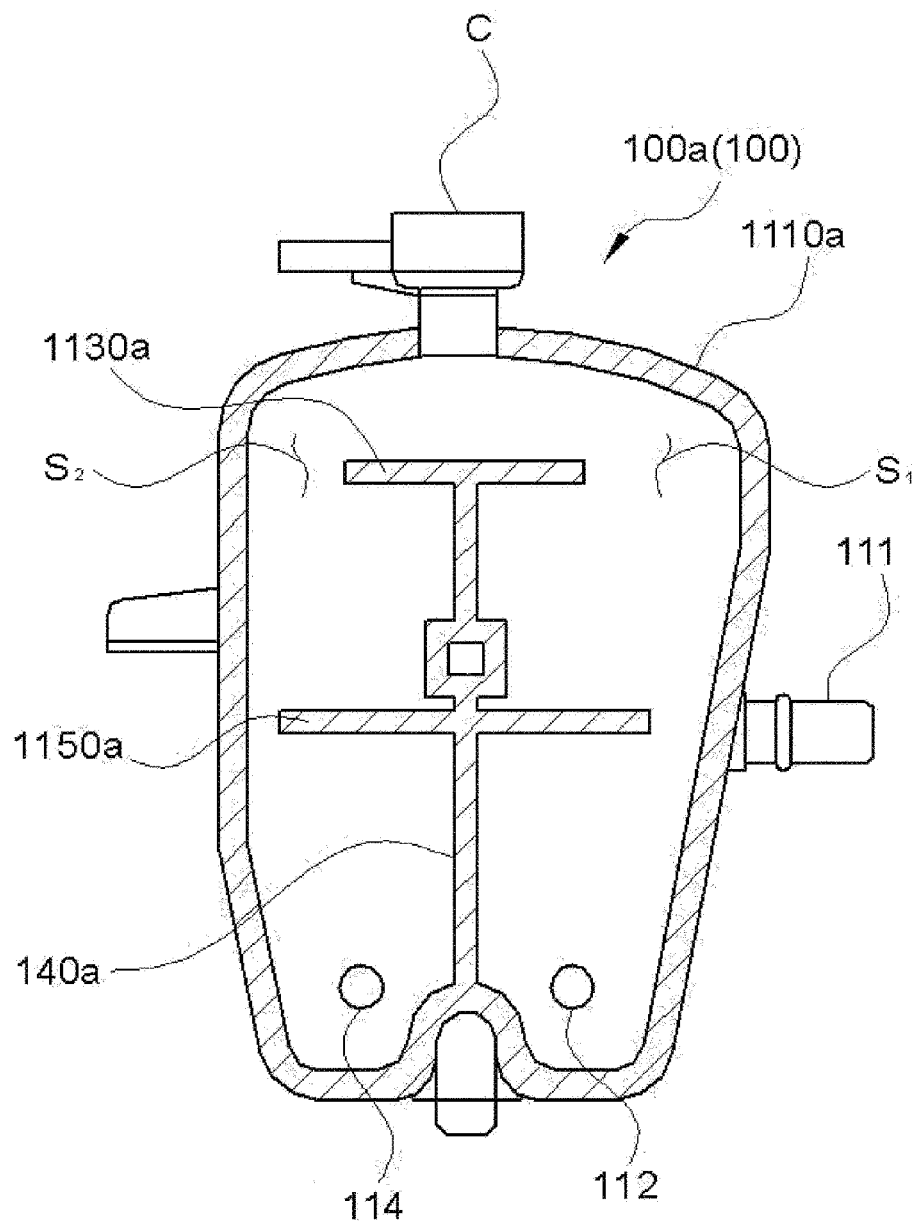
FIGS. 14 and 15 are cross-sectional views of a reservoir tank according to a fourth embodiment of the present disclosure.
Figure 15:
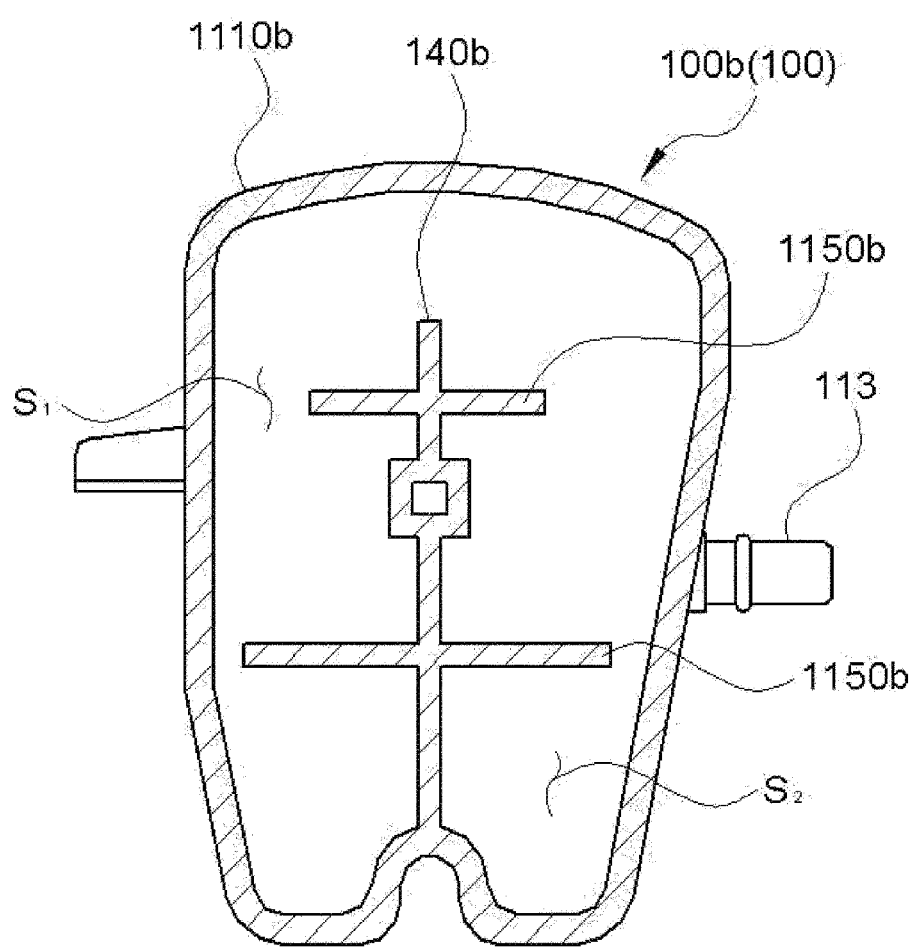

FIGS. 14 and 15 relate to a reservoir tank according to a fourth embodiment of the present disclosure, and FIGS. 14 and 15 illustrate cross-sectional views of a first tank body and a second tank body, respectively. In this case, FIG. 14 is a cross-sectional view from the rear to the front to illustrate the first tank body 100a of the reservoir tank 100. As the left and right sides are reversed in the drawing, description will be made by defining, as one side, the direction in which the first chamber cooling water outlet 112 is disposed, and defining, as the other side, the direction in which the second chamber cooling water outlet 114 is disposed.

Referring to FIGS. 14 and 15, the reservoir tank 100 of the present disclosure may be formed by coupling the first tank body 100a and the second tank body 100b to each other, and the first tank body 100a and the second tank body 100b may include a first housing 1110a and a second housing 1110b, respectively. The first housing 1110a and the second housing 1110b may be coupled to form a hollow portion therein. In this case, the stopper C, the first chamber cooling water inlet 111, the second chamber cooling water inlet 113, the first chamber cooling water outlet 112, and the second chamber cooling water outlet 114 may be disposed on one of the first housing 1110a or the second housing 1110b.

The first reservoir tank 100a may include a first partition wall 140a disposed at central portions of both sides of the first housing 1110a, and the second reservoir tank 100b may include a second partition wall 140b disposed at central portions of both sides of the second housing 1110b. The central portion described above is not limited to the center of both sides, and may be formed in various forms as long as it may partition the first chamber S1 and the second chamber S2. For example, it may be eccentric to the left or right from the center. In this case, the first partition wall 140a of the first reservoir tank 100a and the second partition wall 140b of the second reservoir tank 100b may be disposed to face each other when the first housing 1110a and the second housing 1110b are coupled and formed as one partition wall, and the partition wall may be disposed in one of the first reservoir tank 100a and the second reservoir tank 100b and protrude forward or backward.

The first reservoir tank 100a and the second reservoir tank 100b may each include partition wall step members 1150a and 1150b. In this case, the partition wall step member 1150a of the first reservoir tank 100a may extend to both sides around the first partition wall 140a, and the partition wall step member 1150b of the second reservoir tank 100b may also extend to both sides around the second partition walls 140b. In addition, both end portions of the partition wall step member 1150a of the first reservoir tank 100a are spaced apart from inner surfaces of both sides of the first housing 1110a and a gap is formed therebetween, and both end portions of the partition wall step member 1150b of the second reservoir tank 100b may be spaced apart from inner surfaces of both sides of the second housing 1110b to form a gap therebetween. Here, in the reservoir tank 100 of the present disclosure, the partition wall step member 1150a of the first reservoir tank 100a and the partition wall step member 1150b of the second reservoir tank 100b may be disposed at different heights, and the partition wall step member 1150a of the first reservoir tank 100a and the partition wall step member 1150b of the second reservoir tank 100b may be configured in plurality.

Figure 16:
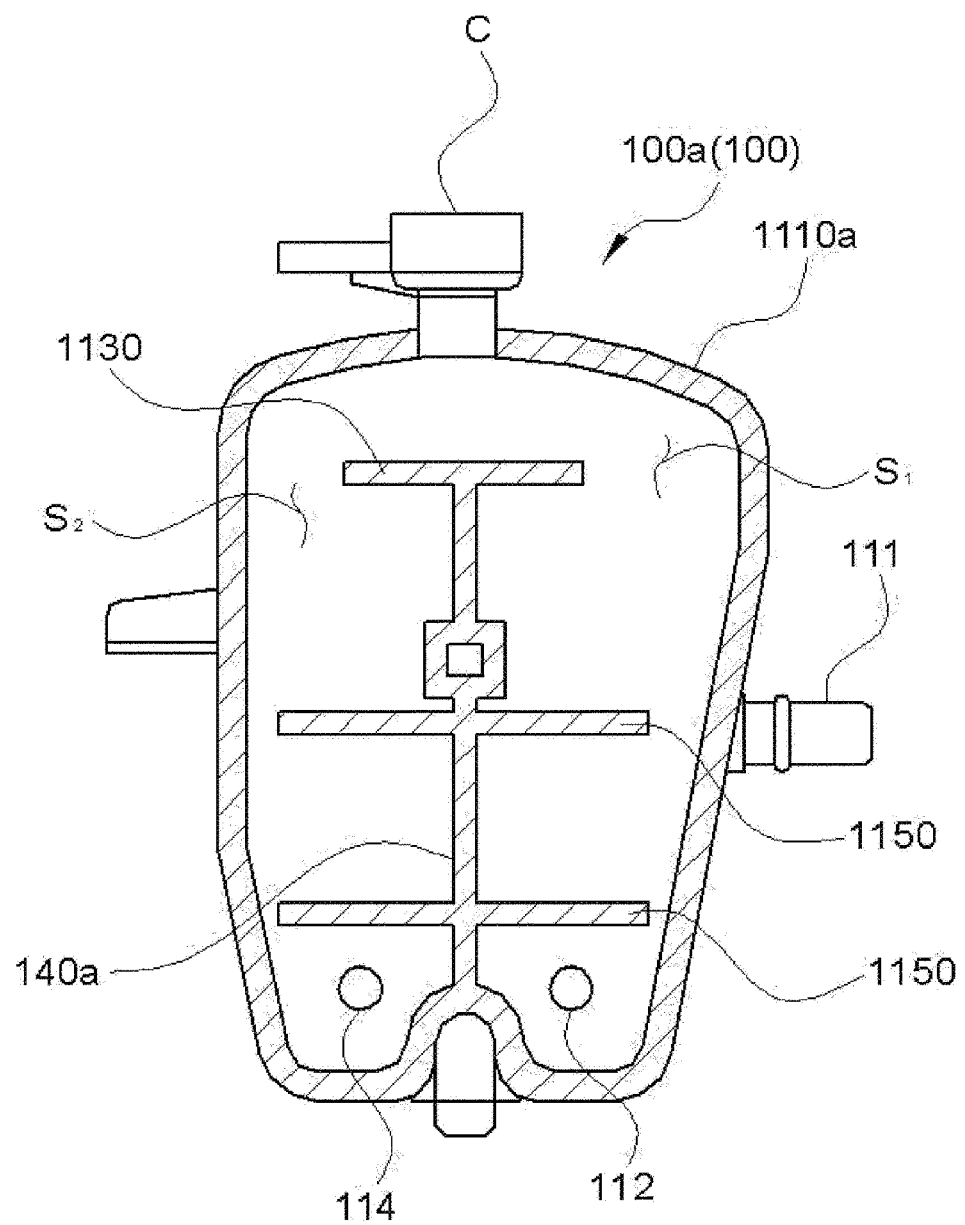
FIGS. 16 and 17 are cross-sectional views of a reservoir tank according to a fifth embodiment of the present disclosure.
Figure 17:
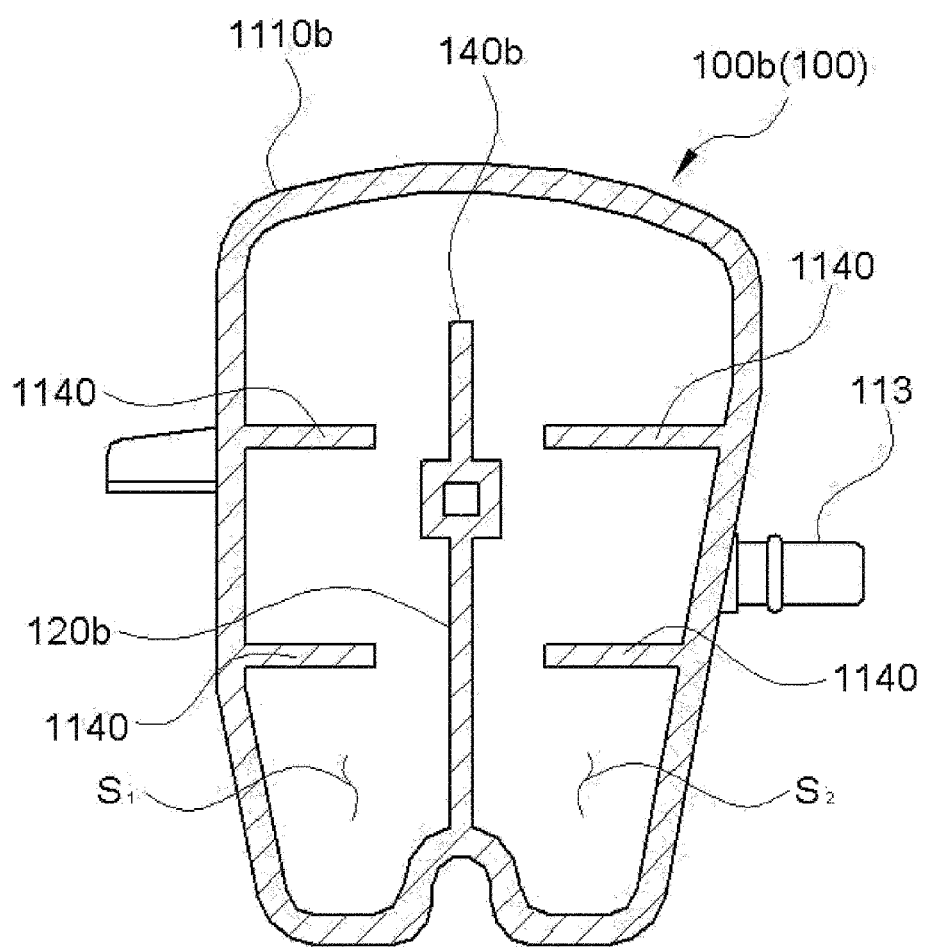

FIGS. 16 and 17 relate to a reservoir tank according to a fifth embodiment of the present disclosure, and FIGS. 16 and 17 illustrate cross-sectional views of the first tank body and the second tank body, respectively. In this case, FIG. 16 is a cross-sectional view from the rear to the front to illustrate the first tank body 100a of the reservoir tank 100. As the left and right sides are reversed in the drawing, description will be made by defining, as one side, the direction in which the first chamber cooling water outlet 112 is disposed, and defining, as the other side, the direction in which the second chamber cooling water outlet 114 is disposed.

Referring to FIGS. 16 and 17, the first reservoir tank 100a may include a first partition wall 140a disposed at the central portions of both sides of the first housing 1110a, and the second reservoir tank 100b may include second partition walls 140b disposed at the central portions of both sides of the second housing 1110b. Also, the first reservoir tank 100a and the second reservoir tank 100b may include at least one of an inner wall step member 1140 and a partition wall step member 1150. As illustrated, the first reservoir tank 100a includes the partition wall step member 1150 and the second reservoir tank 100b includes the inner wall step member 1140, but the present disclosure is limited to such a structure.

More specifically, the first reservoir tank 100a includes the first housing 1110a, the first partition wall 140a extending upward by having a lower end fixed to an inner lower surface of the first housing 1110a, and the partition wall step member 1150 disposed on the first partition wall 140a and extending in both directions. In addition, the second reservoir tank 100b may include the second housing 1110b, the second partition wall 140b having a lower end fixed to the inner lower surface of the second housing 1110b, extending upward, and facing the first partition wall 140a, and the inner wall step member 1140 having one end fixed to inner surfaces of both sides of the second housing 1110b and extending to the second partition wall 140b. Here, the inner wall step member 1140 and the partition wall step member 1150 may be formed in plurality and spaced apart from each other in the vertical direction. In addition, the distribution member 1130 may be disposed in one of the first reservoir tank 100a and the second reservoir tank 100b.

As described above, in the reservoir tank of the present disclosure, when cooling water is injected into the reservoir tank through the inner wall step member and the partition wall step member, or the first cooling water and the second cooling water cooling the battery and power electronics flow, it is possible to suppress the generation of bubbles, and thus, there is an advantage in that the cooling circuit with improved cooling efficiency may be formed.

In addition, the reservoir tank of the present disclosure is connected to a plurality of cooling circuits through a partition wall structure capable of suppressing the generation of bubbles, so the space may be used more efficiently and the user may perform integrated control, thereby saving maintenance time and costs.

Hereinabove, although the present disclosure has been described with reference to exemplary embodiments, the present disclosure is not limited thereto, but may be variously modified and altered by those skilled in the art to which the present disclosure pertains without departing from the spirit and scope of the present disclosure claimed in the following claims.

DESCRIPTION OF REFERENCE SIGNS

10: Water supply module integrated with a reservoir tank
100: Reservoir tank
110: Cooling water entrance
111: First chamber cooling water inlet
112: First chamber cooling water outlet
113: Second chamber cooling water inlet
114: Second chamber cooling water outlet
120: Mounting part
121: First mounting part
122: Second mounting part
130: Through-hole
140: Partition wall
100a: First tank body
100b: Second tank body
1101: Cooling water inlet
1110: Housing
1110a: First housing
1110b: Second housing
1130: Distribution member
1131: First distribution member
1132: Second distribution member
1140: Inner wall step member
1141: First inner wall step member
1142: Second inner wall step member
1150: Partition wall step member
1151: First partition wall step member
1152: Second partition wall step member
200: Valve assembly
210: Bifurcating part
220: Water pump mounting part
221: First water pump mounting part
222: Second water pump mounting part
250: Surface contact portion
251: O-ring
300: Chiller
320: Chiller component coupling structure
400: Water pump
410: First water pump
420: Second water pump
500: Expansion valve
600: Gasket
A, B: First, second cooling water
C1: First cooling circuit
C2: Second cooling circuit
F: Cooling water
S1: First chamber
S2: Second chamber
V1, V2, V3, V4, V5: First, second, third, fourth, fifth bifurcating path

The invention claimed is:

1. A water supply module integrated with a reservoir tank, comprising:
a reservoir tank in which a hollow portion is formed to accommodate cooling water therein, and which includes a first mounting part provided on one side thereof and a second mounting part provided on the other side thereof;
a first component mounted on the first mounting part; and
a second component mounted on the second mounting part,
wherein the first component and the second component pass through the reservoir tank so as to be connected,
wherein the reservoir tank includes:
a housing having the hollow portion formed therein;

a partition wall disposed inside the housing to partition the hollow portion of the housing into a plurality of chambers;
a step member disposed inside the reservoir tank to control a flow of the cooling water flowing inside the reservoir tank, and
the flow of the cooling water is guided such that bubbles contained in the cooling water are removed by the step member,
wherein the step member includes:
an inner wall step member having one end fixed to an inner wall of the housing and the other end extending to the partition wall;
a partition wall step member having one end fixed to the partition wall and the other end extending to the inner wall of the housing, and
the cooling water flowing inside the housing by the inner wall step member and the partition wall step member flows in a zigzag form along the inner wall step member and the partition wall step member.

2. The water supply module integrated with a reservoir tank of claim 1, wherein the reservoir tank is provided with a through-hole passing in a direction from the first mounting part to the second mounting part, and
the cooling water flows between the first component and the second component through the through-hole.

3. The water supply module integrated with a reservoir tank of claim 2, further comprising:
a pipe connecting the first component and the second component,
wherein the pipe connects the first component and the second component by passing through the through-hole.

4. The water supply module integrated with a reservoir tank of claim 2, wherein a partition wall dividing an internal space of the reservoir tank into a first chamber and a second chamber is provided inside the reservoir tank.

5. The water supply module integrated with a reservoir tank of claim 4, wherein the through-hole is formed to pass through the partition wall.

6. The water supply module integrated with a reservoir tank of claim 5, wherein a thickness of the partition wall is smaller than a width of a cross section of the through-hole.

7. The water supply module integrated with a reservoir tank of claim 4, wherein first cooling water circulating the first cooling circuit among the cooling water flows in the first chamber, and second cooling water circulating the second cooling circuit among the cooling water flows in the second chamber,
the reservoir tank further includes a plurality of cooling water entrances through which the cooling water enters and exits, and
the plurality of cooling water entrances includes:
a first chamber cooling water inlet introducing the first cooling water into the first chamber;
a first chamber cooling water outlet discharging the first cooling water to an outside of the first chamber;
a second chamber cooling water inlet introducing the second cooling water into the second chamber; and
a second chamber cooling water outlet discharging the second cooling water to an outside of the second chamber.

8. The water supply module integrated with a reservoir tank of claim 7, wherein an inside of the first component is provided with a valve assembly having an internal path through which the cooling water flows,
the internal path of the valve assembly includes a bifurcating part bifurcated in multiple directions, and
the internal path includes first to fifth bifurcating paths bifurcated in each direction from the bifurcating part.

9. The water supply module integrated with a reservoir tank of claim 8, wherein the second component and the first bifurcating path communicate with each other through the through-hole, the second and third bifurcating paths form the first cooling circuit, and the fourth and fifth bifurcating paths form the second bifurcating path, and
the first chamber cooling water outlet communicates with any one of the second and third bifurcating paths, and the second chamber cooling water outlet communicates with any one of the fourth and fifth bifurcating paths.

10. The water supply module integrated with a reservoir tank of claim 9, wherein the valve assembly includes a first water pump mounting part provided to communicate with any one of the second and third bifurcating paths, and a second water pump mounting part provided to communicate with any one of the fourth and fifth bifurcating paths,
the first water pump mounting part is mounted with a first water pump that pressurizes and transfers the first cooling water flowing through the second and third bifurcating paths, and
the second water pump mounting part is mounted with a second water pump that pressurizes and transfers the second cooling water flowing through the fourth and fifth bifurcating paths.

11. The water supply module integrated with a reservoir tank of claim 8, wherein the second component is a chiller that regulates a temperature of the cooling water, and
the chiller includes a pair of pipes through which the cooling water enters and exits, and any one of the pair of pipes passes through the through-hole and is connected to the valve assembly.

12. The water supply module integrated with a reservoir tank of claim 11, wherein the chiller includes a chiller component coupling structure in which components are coupled, and
an expansion valve decompressing the cooling water is coupled to the chiller component coupling structure, and the expansion valve is disposed between the chiller and the reservoir tank.

13. The water supply module integrated with a reservoir tank of claim 1, wherein the first mounting part is provided with a gasket coupling structure,
a gasket is coupled to the gasket coupling structure and disposed between the reservoir tank and the first component, and
the gasket is a face gasket, and the first component and the face gasket are in surface contact.

14. The water supply module integrated with a reservoir tank of claim 1, wherein the inner wall step member and the partition wall step member are formed in plurality, and the plurality of inner wall step members and partition wall step members are alternately arranged along a vertical direction of the reservoir tank.

15. The water supply module integrated with a reservoir tank of claim 1, wherein the plurality of chambers include a first chamber and a second chamber partitioned by the partition wall, and
the housing includes:
a first chamber cooling water inlet introducing the first cooling water into the first chamber;
a first chamber cooling water outlet discharging the first cooling water from an inside to an outside of the first chamber;

a second chamber cooling water inlet introducing second cooling water into the second chamber; and a second chamber cooling water outlet discharging the second cooling water from the second chamber to the outside, and the first cooling water outlet is disposed below the first chamber cooling water inlet, and the second cooling water outlet is disposed below the second chamber cooling water inlet.

16. The water supply module integrated with a reservoir tank of claim 1, further comprising:

a cooling water inlet disposed above the housing and through which the cooling water is introduced from the outside; and a distribution member disposed at an upper end of the partition wall to distribute the cooling water introduced from the outside into the first chamber and the second chamber.

17. The water supply module integrated with a reservoir tank of claim 16, wherein the inner wall step member includes:

a first inner wall step member disposed on the first chamber and having one end fixed to the inner wall of the housing and the other end extending to the partition wall; and a second inner wall step member disposed on the second chamber and having one end fixed to the inner wall of the housing and the other end extending to the partition wall, and the partition wall step member includes:

a first partition wall step member disposed on the first chamber and having one end fixed to the partition wall member and the other end extending to the inner wall of the housing; and a second partition wall step member disposed on the second chamber and having one end fixed to the partition wall member and the other end extending to the inner wall of the housing.

18. The water supply module integrated with a reservoir tank of claim 1, wherein the housing includes a first housing and a second housing coupled to each other to form the hollow portion therein, the step member is formed in plurality, and some of the plurality of step members are disposed in the first housing, and others are disposed in the second housing.

* * * * *